United States Patent
De Nardi et al.

(10) Patent No.: US 9,918,020 B2
(45) Date of Patent: Mar. 13, 2018

(54) USER PORTABLE DEVICE HAVING FLOATING SENSOR ASSEMBLY TO MAINTAIN FIXED GEOMETRIC CONFIGURATION OF SENSORS

(71) Applicant: Google Inc., Mountain View, CA (US)

(72) Inventors: Renzo De Nardi, Sunnyvale, CA (US); Johnny Lee, Mountain View, CA (US); Alan Beltran, Mountain View, CA (US); Ashish Shah, San Jose, CA (US)

(73) Assignee: Google LLC, Mountain View, CA (US)

( * ) Notice: Subject to any disclaimer, the term of this patent is extended or adjusted under 35 U.S.C. 154(b) by 54 days.

(21) Appl. No.: 14/750,958

(22) Filed: Jun. 25, 2015

(65) Prior Publication Data

US 2015/0381860 A1 Dec. 31, 2015

Related U.S. Application Data

(60) Provisional application No. 62/016,826, filed on Jun. 25, 2014.

(51) Int. Cl.
*H04N 5/225* (2006.01)
*H04N 5/247* (2006.01)
*G06F 1/16* (2006.01)

(52) U.S. Cl.
CPC ........... *H04N 5/247* (2013.01); *G06F 1/1686* (2013.01); *H04N 5/2251* (2013.01); *G06F 1/1632* (2013.01)

(58) Field of Classification Search
CPC ............... H04N 5/2253; H04N 5/2254; H04N 13/0239; H04N 13/0242; H04N 5/247; H04N 5/2252; H04N 5/2251; G06F 1/16; G06F 1/1686; G06F 1/1632
USPC ......... 348/E5.026, E5.027, E5.028, 48, 159, 348/373–376; 248/683
See application file for complete search history.

(56) References Cited

U.S. PATENT DOCUMENTS

| | | | | |
|---|---|---|---|---|
| 5,638,461 | A * | 6/1997 | Fridge | G01N 21/88 348/190 |
| 2004/0105329 | A1* | 6/2004 | Lin | H05K 5/0278 365/202 |
| 2006/0061859 | A1* | 3/2006 | Chen | G02F 1/133308 359/443 |
| 2011/0003622 | A1* | 1/2011 | Hwang | H05K 1/0215 455/575.1 |
| 2012/0081550 | A1* | 4/2012 | Sewell | H04N 5/2251 348/148 |

(Continued)

*Primary Examiner* — Lin Ye
*Assistant Examiner* — Euel Cowan

(57) ABSTRACT

A user portable device includes a device chassis comprising at least one opening at a surface of the device chassis and a sensor assembly aligned with the at least one opening. The sensor assembly includes a mounting structure and a plurality of sensors mounted to the mounting structure. The sensors include at least two sensors utilized by the user portable device based on a specified geometric configuration between the at least two sensors. The user portable device further includes a mounting fastener that mounts the sensor assembly to the device chassis so as to isolate the sensor assembly from deformation of the surface of the device chassis along one or more axes during user handling, and thus aid in preventing alteration of a baseline geometric configuration of one or more sensors of the sensor assembly due to the chassis deformation.

26 Claims, 13 Drawing Sheets

(56) References Cited

U.S. PATENT DOCUMENTS

| | | | | |
|---|---|---|---|---|
| 2013/0093946 A1* | 4/2013 | Nakagawa | ........... | H04N 5/2252 |
| | | | | 348/374 |
| 2013/0329460 A1* | 12/2013 | Mathew | ................... | H05K 5/02 |
| | | | | 362/612 |
| 2013/0342672 A1* | 12/2013 | Gray | ....................... | G06F 3/013 |
| | | | | 348/78 |
| 2015/0264232 A1* | 9/2015 | Yang | .................... | H04N 5/2254 |
| | | | | 348/373 |

* cited by examiner

USER PORTABLE DEVICE HAVING FLOATING SENSOR ASSEMBLY TO MAINTAIN FIXED GEOMETRIC CONFIGURATION OF SENSORS

CROSS-REFERENCE TO RELATED APPLICATIONS

The Present Application claims priority to U.S. Patent Application No. 62/016,826, entitled "User Portable Device Having Floating Sensor Assembly to Maintain Fixed Geometric Configuration of Sensors" and having a filing date of Jun. 25, 2014, the entirety of which is incorporated by reference herein.

BACKGROUND

Field of the Disclosure

The present disclosure relates generally to user portable devices and, more particularly, to user portable devices utilizing machine vision functionality.

Description of the Related Art

Machine-vision-enabled devices employ various sensors to provide visual inertial sensing or stereoscopic vision functionality. Typically, the processing components that utilize data from these sensors process the information based on the assumption of a fixed geometric configuration between two or more of the sensors. Any changes in this inter-sensor geometric configuration thus can negatively impact the accuracy of the sensor data, which in turn negatively impacts the accuracy of the functionality provided by the processes utilizing the sensor data.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

Figure 1:
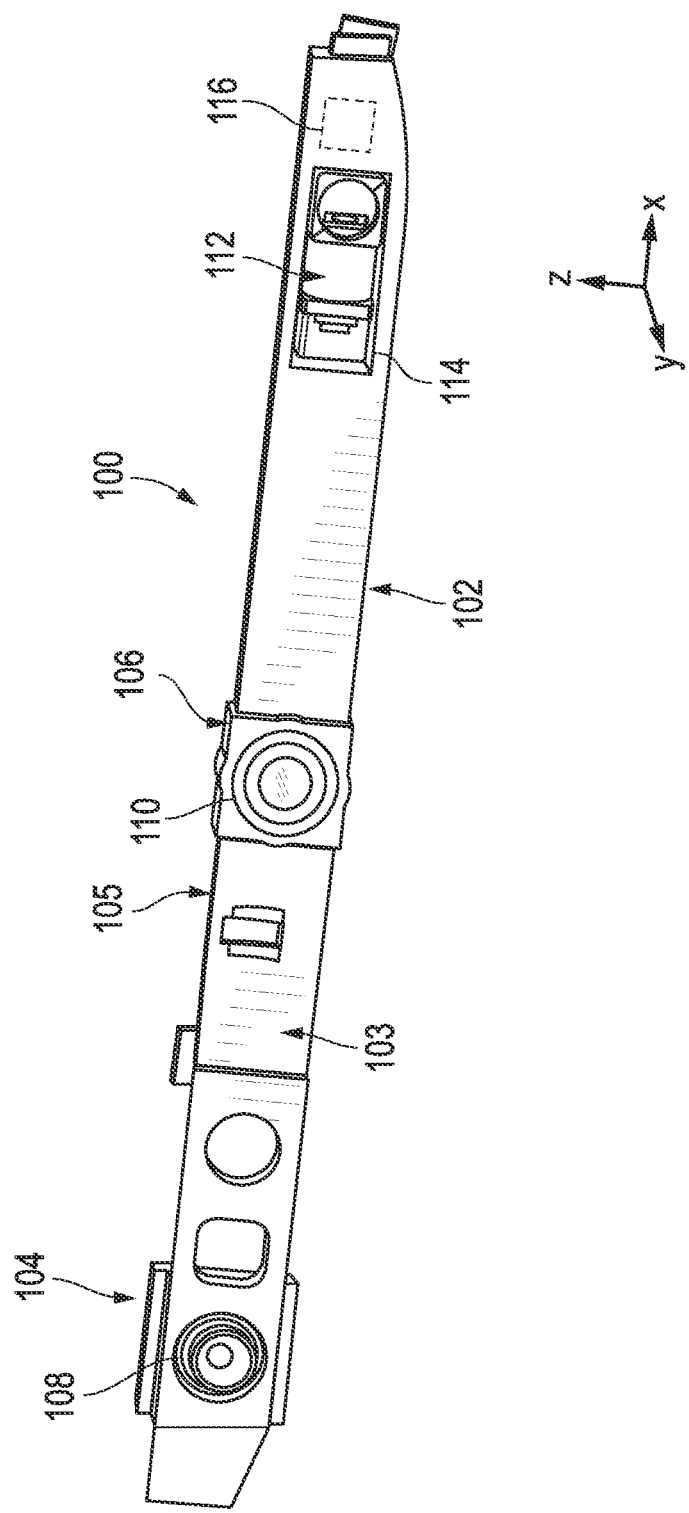
FIG. 1 is a perspective view of a front side of a floating sensor assembly for a user portable device in accordance with at least one embodiment of the present disclosure.

The following description is intended to convey a thorough understanding of the present disclosure by providing a number of specific embodiments and details for user portable devices employing sensors in support of machine vision functionality. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-13 illustrate various techniques for the provision of a user portable device employing a floating sensor assembly that supports machine-vision-based functionality, such as visual odometry and other visual inertial sensing, stereoscopic vision, and the like. The floating sensor assembly incorporates various sensors in support of this functionality, such as one or more imaging cameras or other electro-optical sensors to provide imaging information and an inertial measurement unit (IMU) employing one or more inertial sensors, as well as other supporting components, such as a structured light projector to provide infrared-based depth sensing in conjunction with one or more of the electro-optical sensors, a flash light source to provide light flashes for still image capture by one or more of the electro-optical sensors, and the like.

The processing of the data from the sensors of the sensor assembly often is based on an assumption that there is a fixed, or baseline, geometric configuration between two or more sensors. This baseline geometric configuration can include one or both of a fixed geometric orientation between the at least two sensors and a fixed distance between the at least two sensors. For example, stereoscopic vision applications using data from two imaging cameras may employ a fixed distance between the two imaging cameras and fixed angles of view between the two imaging cameras in processing the data from the two imaging cameras. Similarly, visual inertial sensing applications using data from an imaging camera and the IMU may assume a fixed distance between these two sensors, as well as a fixed geometric orientation relative to each other. Deviation of the sensors from this baseline geometric configuration impacts the accuracy of the processes utilizing the sensors.

The incorporation of machine-vision-based sensing into user portable devices, such as tablet computers and computing-enabled cellular phones, leads to significant challenges in attempting to maintain the baseline geometric configuration between the sensors. The normal or anticipated user handling of user portable devices imparts torque forces on the chassis of such devices, and cost, weight, and size limitations prevent the use of a device chassis that is sufficiently rigid to avoid deformation of the device chassis in the presence of such anticipated forces. The inventors have discovered that the deformation of the device chassis in the presence of normal user handling often is sufficient to materially shift chassis-mounted sensors from their baseline geometric configurations, and thus materially impact the accuracy of machine-vision processes that assume fixed baseline geometric configurations among the sensors.

To reduce or eliminate the impact of chassis deformation on the geometric configurations of machine-vision sensors, in at least one embodiment a user portable device employs a floating sensor assembly that provides a rigid mount for the machine-vision sensors so as to fix the baseline geometric configurations of the machine-vision sensors. The floating sensor assembly also provides substantial mechanical isolation between the floating sensor assembly and the device chassis through the use of a mounting fastener that mounts the floating sensor assembly to the device chassis in a manner that permits translation of the floating sensor assembly along one or more axis relative to the device chassis in the presence of deformation of the device chassis due to user handling of the user portable device. In some embodiments, this mechanical isolation is achieved through the use of a mounting fastener that mounts the floating sensor assembly to the device chassis at only a single point of mechanical attachment or contact between the floating sensor assembly and the device chassis. In other embodiments, the mechanical isolation is achieved through the use of a mounting fastener that utilizes two or more flexible mounting components that permit significant translation of the floating sensor assembly in one or more axes relative to device chassis. The flexibility in these mounting components may be provided by using a flexible material, such as a flexible rubber, silicone, or relatively thick adhesive table, by using joints that facilitate translation in one or more planes or around one or more axis, or combinations thereof.

Deformation of the components of a user device is a result of torqueing forces, and a torqueing force requires opposite forces to be applied at two different points. The configuration of the mounting fastener that allows the floating sensor assembly to translate in one or more directions relative to a mounting surface of the device chassis prevents the deformation of the mounting surface from applying a substantive torqueing force to the floating sensor assembly. As such, implementations of the mounting fastener described herein, in combination with sufficient clearances between the surfaces of the floating sensor assembly and the proximate surfaces of the device chassis and the use of flexible electrical connectors to provide the electrical connections between the floating sensor assembly and the remainder of the device, ensures that the mechanical deformation of the user portable device during normal handling will not induce torque, and therefore deformation, on the floating sensor assembly. As a result, the baseline geometric configurations of the sensors of the sensor bar may be maintained while a user is handling the user portable device.

Figure 9:
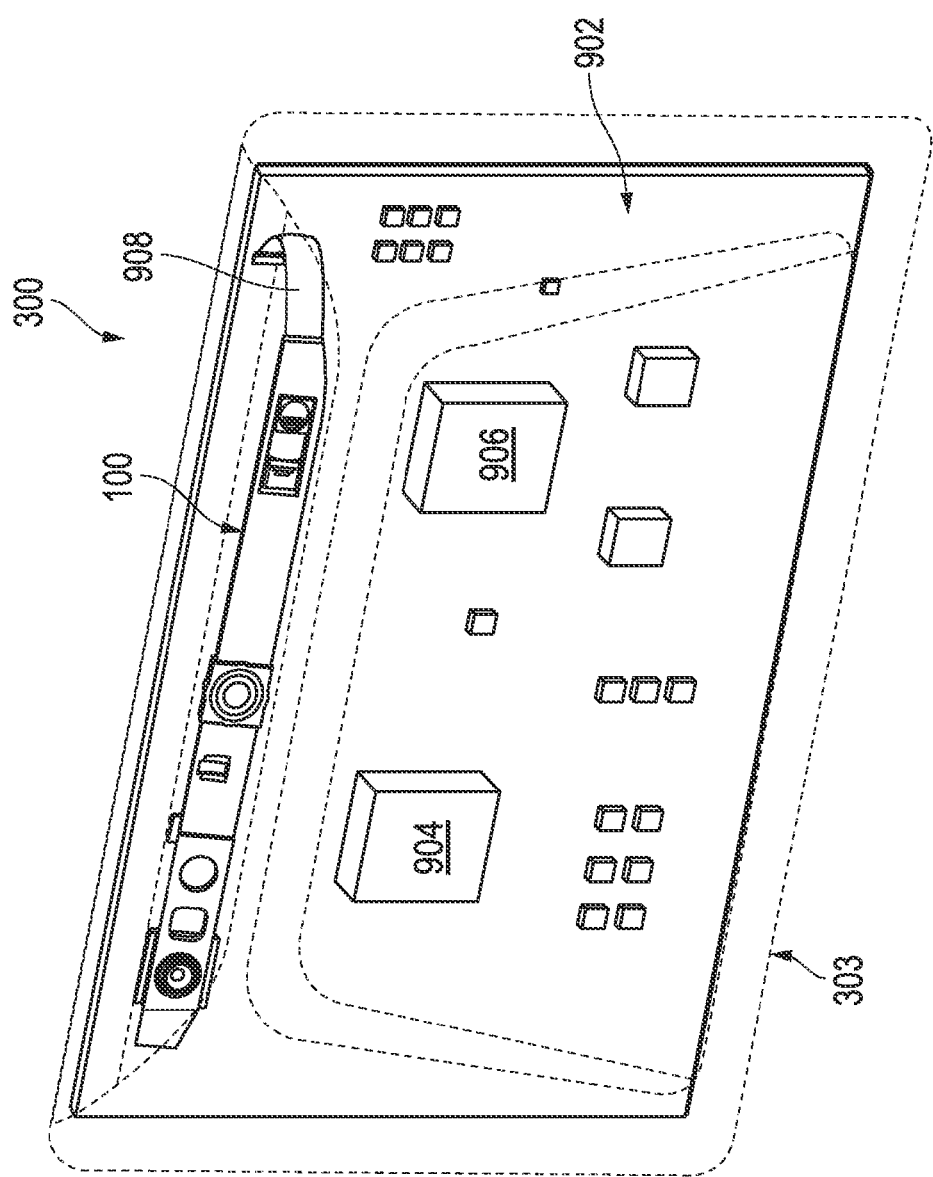
FIG. 9 is a perspective view of internal components of an implementation of the user portable device of FIG. 3 in accordance with at least one embodiment of the present disclosure.
Figure 10:
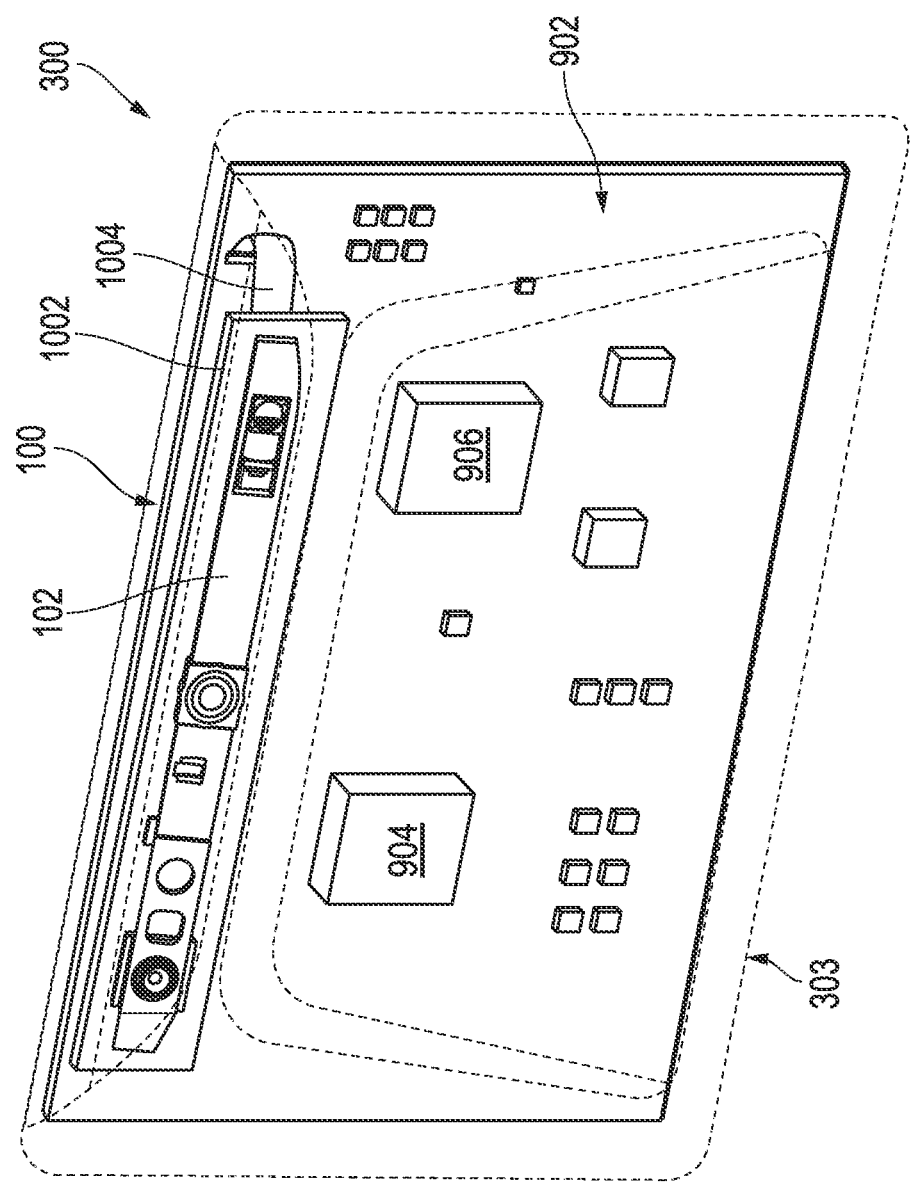
FIG. 10 is a perspective view of internal components of another implementation of the user portable device of FIG. 3 in accordance with at least one embodiment of the present disclosure.
Figure 11:
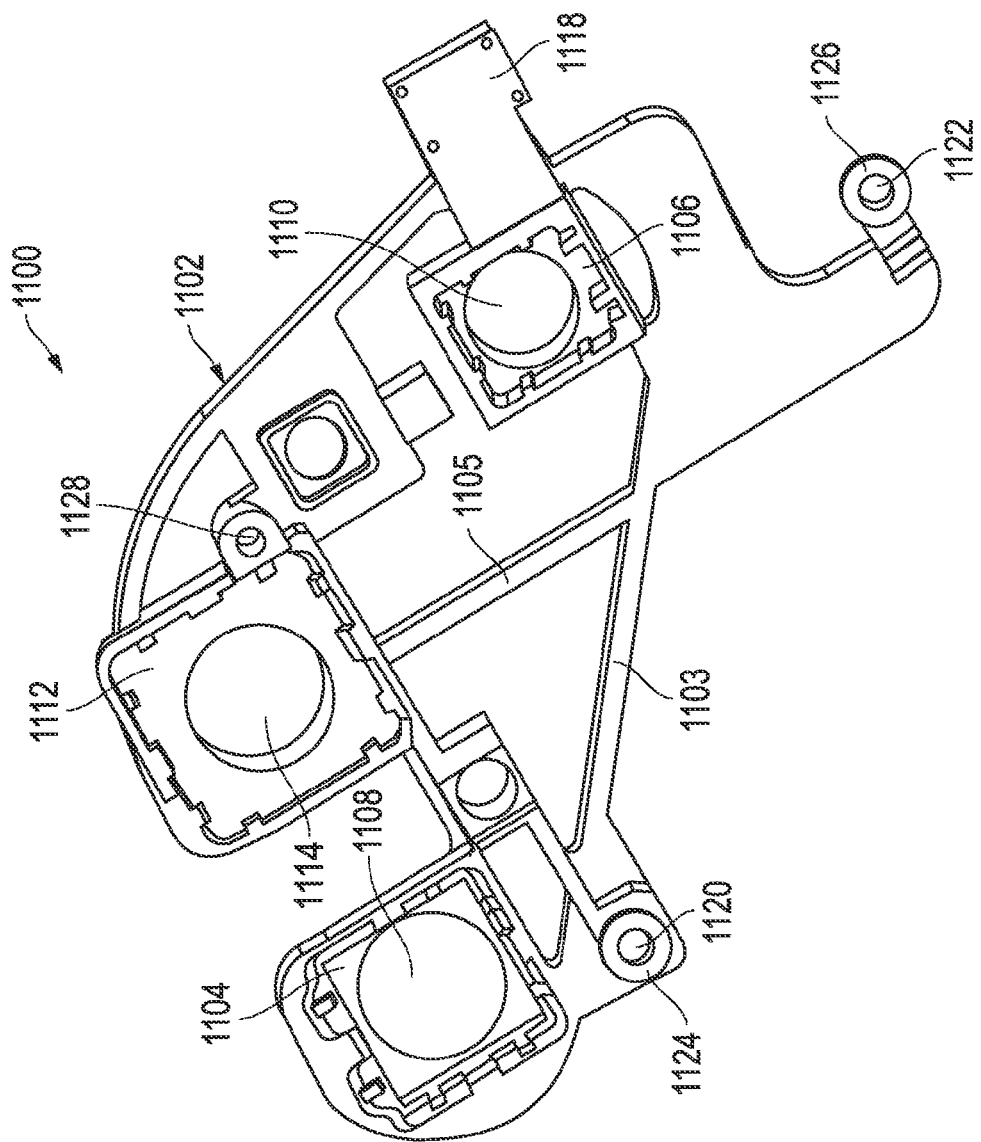
FIG. 11 is a perspective view of a back side of another floating sensor assembly for a user portable device in accordance with at least one embodiment of the present disclosure.
Figure 12:
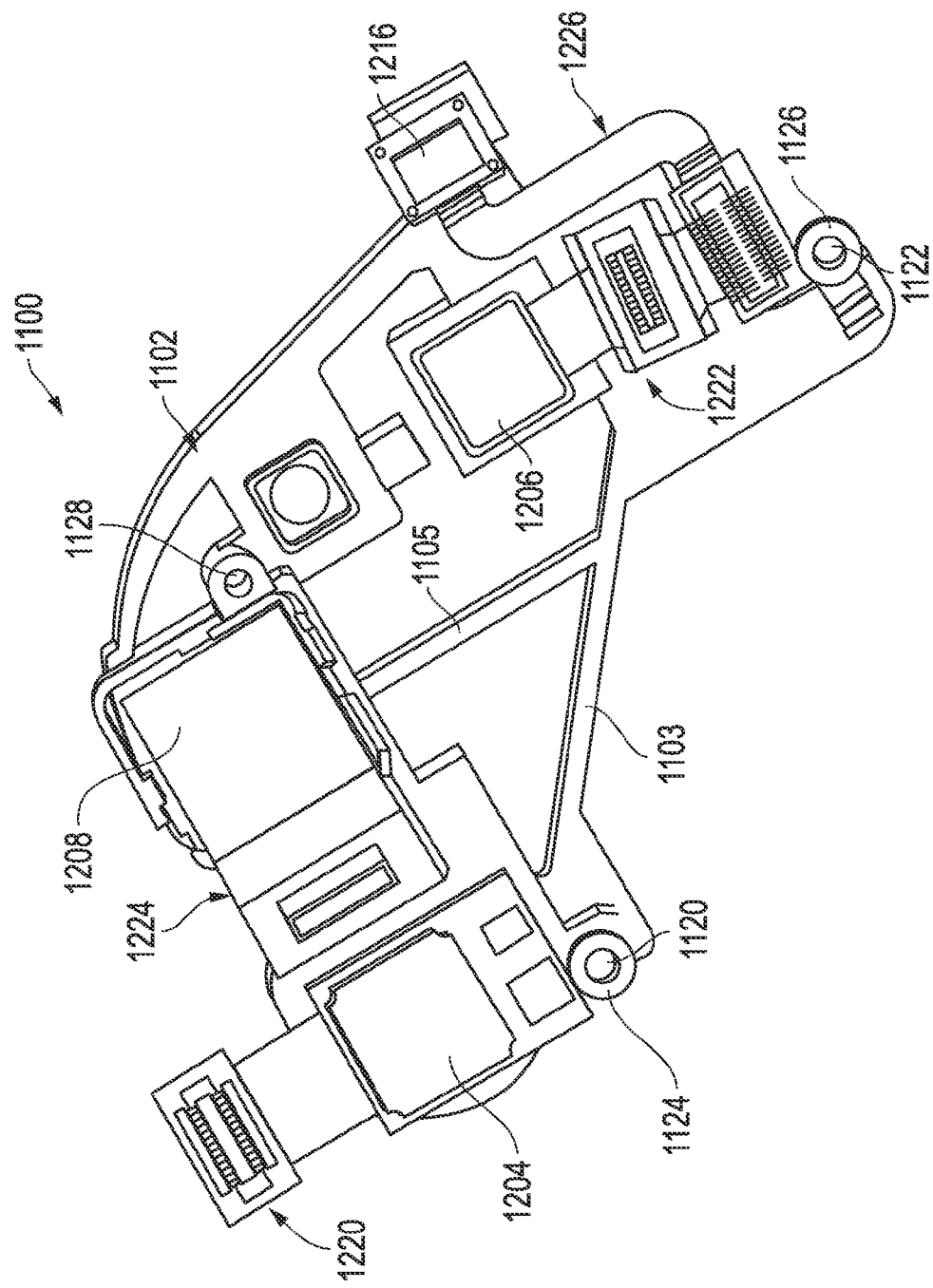
FIG. 12 is a perspective view of the back side of the floating sensor assembly of FIG. 11 with sensors mounted thereon in accordance with at least one embodiment of the present disclosure.
Figure 13:
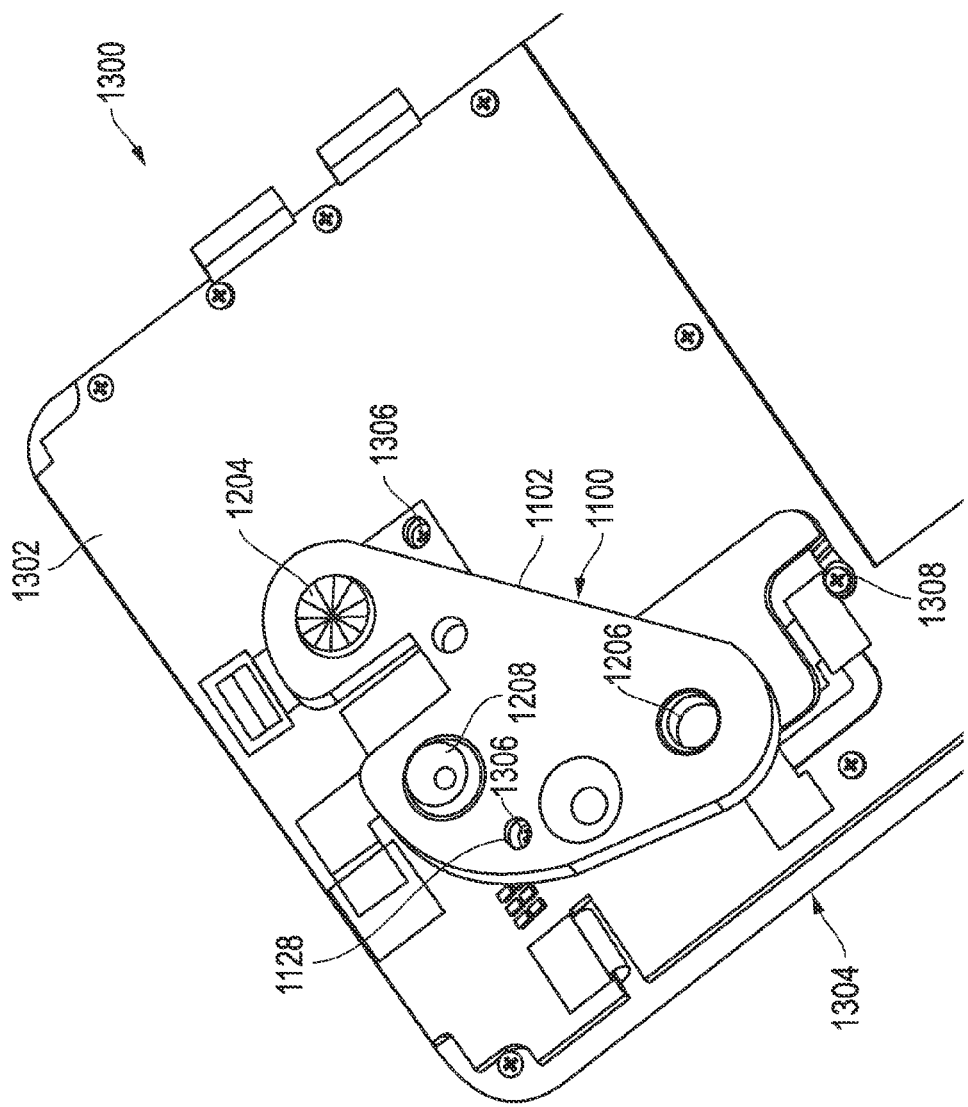
FIG. 13 is a perspective view of the floating sensor assembly of FIG. 12 mounted on the device chassis of a user portable device in accordance with at least one embodiment of the present disclosure.

In the following, FIGS. 1-10 illustrate an example floating sensor assembly for implementation in a relatively large user portable device, such as a tablet computer, and FIGS. 11-13 illustrate an example floating sensor assembly for implementation in a relatively small user portable device, such as a computing-enabled cellular phone (i.e., a "smart phone") or a personal digital assistant. However, aspects of the floating sensor assembly of FIGS. 1-10 may be incorporated into the floating sensor assembly of FIGS. 11-13, and vice versa.

FIG. 1 illustrates a perspective view of a front side of a floating sensor assembly 100 of a machine-vision-enabled user portable device in accordance with at least one embodiment of the present disclosure. In the depicted example, the floating sensor assembly 100 comprises an oblong mounting structure 102 upon which a plurality of machine-vision sensors and related components are mounted. In the example of FIG. 1, the mounting structure 102 is in the form of a bar structure and thus referred to herein as "bar structure 102." The bar structure 102 is composed of one or more materials that impart rigidity along one or more axes of the bar structure 102. To illustrate, the bar structure 102 may be formed from one or combination of a metal or metal alloy, carbon fiber, ceramic, glass, glass fiber reinforced epoxy resin or laminate (e.g., FR4), and the like. As a particular example, the bar structure 102 may consist essentially of aluminum-magnesium (Al—Mg) alloy, which demonstrates suitable rigidity while being cost effective and relatively light. The bar structure 102 further may employ structural features, or a cross-section or profile, that enhance its rigidity. To this end, the bar structure 102 may be formed with one or more spines along its long axis (the x-axis in the depicted example) or formed with a rail profile, a C-channel profile, a T-channel profile, a hollow structural section (HSS) profile, an angle profile, and the like, or combinations thereof.

The bar structure 102 comprises mounting areas for the machine-vision sensors and associated non-sensor components. These mounting areas can include areas on a front face of the bar structure 102, areas on the back face of the bar structure 102 that are aligned with opening or other openings in the bar structure, recesses in the bar structure in which corresponding sensors are mounted. To illustrate, in the depicted example the floating sensor assembly 100 includes electro-optical sensors 104 and 106 (e.g., visible-light or infrared imaging cameras) mounted to areas on the back side of the bar structure 102 with the lenses of the electro-optical sensors 104 and 106 protruding through openings 108 and 110, respectively, in the bar structure 102. The floating sensor assembly 100 also includes a structured light projector 112 mounted in a recess 114 formed at the front side of the bar structure 102, as well as an inertial measurement unit (IMU) 116 mounted at an area on the back side of the bar structure 102. The IMU 116 can comprise one or more inertial sensors, such as a gyroscope, accelerometer, and the like. Other components mounted to the bar structure 10 can include, for example, a flash source for providing camera flashes, a light sensor to detect the intensity of light incident on the user portable device, and the like. The sensors and other components may be mounted to the bar structure 102 using any of a variety of fastening means, such as high-strength adhesive, high-strength adhesive foam tape, screws, bolts, rivets, press-fit pins, cold welding, and the like.

Figure 2:
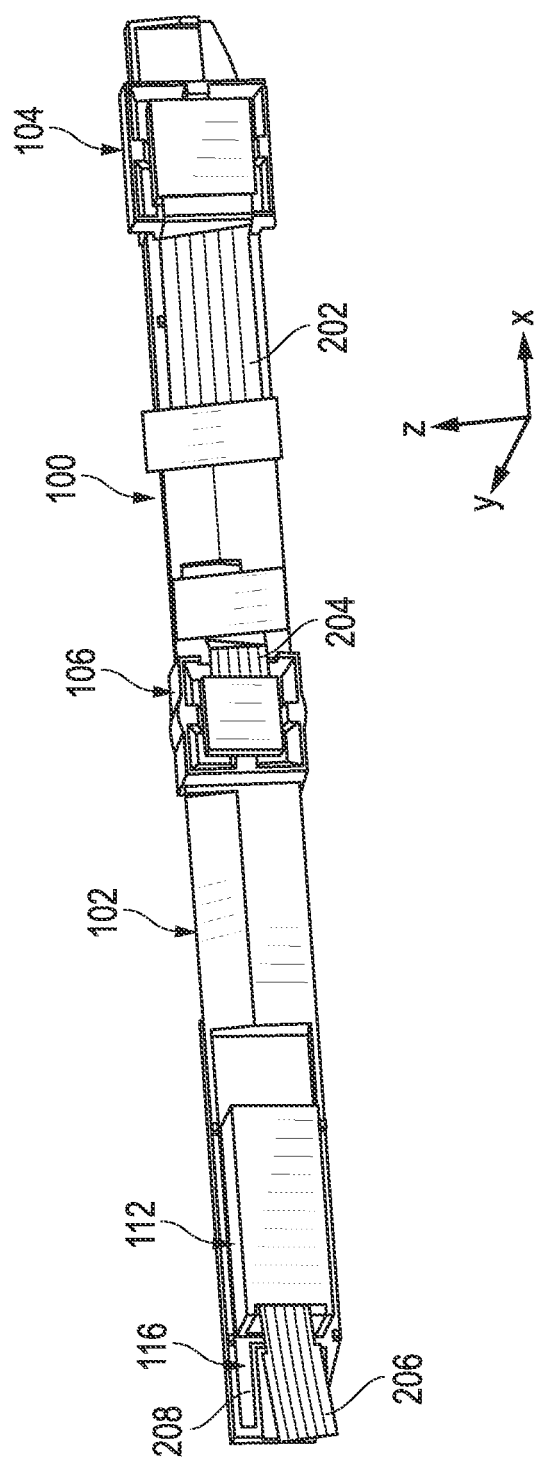
FIG. 2 is a perspective view of a back side of the floating sensor assembly of FIG. 1 in accordance with at least one embodiment of the present disclosure.

FIG. 2 illustrates a perspective view of a back side of the floating sensor assembly 100 in accordance with at least one embodiment. As illustrated by this view, the sensors and other components of the floating sensor assembly 100 are electrically connected to corresponding components of a user portable device via flexible electrical connections that do not impart material mechanical forces on the floating sensor assembly 100. Examples of these flexible electrical connections include flexible flat cables (FFCs), individual thin gauge wires, thin, flexible bundled wire cables, and the like. In the depicted example, the electro-optical sensor 104, the electro-optical sensor 106, the structured light projector 112, and the IMU 116 are electrically connected to a printed circuit board (PCB) or other component of the chassis of the user portable device via flexible flat cables 202, 204, 206, and 208, respectively.

The rigidity of the bar structure 102 facilitates the maintenance of fixed, or baseline, geometric configurations between the machine-vision sensors that may be used assumed by applications of the user portable device employing the floating sensor assembly 100. These baseline geometric configurations can include fixed spatial distances between sensors, fixed geometric orientations between sensors, or combinations thereof. To illustrate, one or more machine-vision processes executed at the user portable device may assume that there is a fixed distance between the electro-optical sensors 104 and 106, and further that the relationship between the angles of view of these sensors is fixed. As another example, one or more machine vision processes executed at the user portable device may assume that there is a fixed distance between the electro-optical sensor 106 and the IMU 116. These baseline geometric configurations may be determined from the design of the floating sensor assembly 100. Alternatively, some or all of the baseline geometric configurations may be determined through application of a sensor calibration process on a device-by-device basis.

In the absence of torque or other deformation forces from user handling, the profile and materials of the bar structure 102 are sufficiently rigid to maintain the machine-vision sensors in their baseline geometric configurations while adhering to cost, size, and weight limitations. However, the floating sensor assembly 100 may be utilized in a user portable device having a form factor that may result in substantial torque placed on the user portable device when being handled by a user. One such example is a device having a tablet form factor in which a user may place significant torque along the long axis of the device simply through the act of holding each end of the device in a horizontal, or landscape, orientation. This torque in turn deforms the chassis of the device, which in turn could otherwise deform the bar structure 102 (and thus shift the sensors relative to each other).

To limit the impact of deformation of the device chassis, in at least one embodiment the floating sensor assembly 100 employs a mounting fastener (not shown in FIGS. 1 and 2) to mount the floating sensor assembly 100 to the device chassis so as to isolate the floating sensor assembly from the deformation of the device chassis. The mounting fastener is configured to permit translation of the floating sensor assembly along one or more axes relative to the corresponding mounting surface of the device chassis.

In one embodiment, the mounting fastener isolates the floating sensor assembly 100 from chassis deformation by employing two or more flexible fastening components that provide flexible attachments between the floating sensor assembly and the mounting surface of the device chassis. Such flexible attachments permit the floating sensor assembly 100 to translate in one more directions relative to the mounting surface of the device chassis, and thus deformation of the device chassis can be translated to a change in the orientation of the floating sensor assembly 100 relative to the mounting surface, rather than being applied as a torque to the floating sensor assembly 100. The flexibility of such attachments may be provided by using flexible materials for the fastening components, such as through the use of relatively thick adhesive foam, rubber, silicone, and the like. The flexibility also may be provided by using mechanical joints for the fastening components. As described in greater detail below with reference to FIGS. 6-8, the mounting fastener may employ a combination of mechanical joints that allow the floating sensor assembly 100 to materially translate along the long axis of the floating sensor assembly 100, thereby isolating the floating sensor assembly 100 from deformation of the device chassis along an axis parallel to the long axis of the floating sensor assembly 100.

In other embodiments, the mounting fastener isolates the floating sensor assembly 100 from chassis deformation by using only a single chassis mount point mounting the sensor assembly to the chassis, or body, of the user portable device. By using a single chassis mount point, there is only one point of mechanical contact between the floating sensor assembly 100 and the rest of the user portable device. With only one point of mechanical contact, the deformation of the chassis of the user portable device is unable to translate to deformation of the bar structure 102, and thus the geometric configurations of the machine-vision sensors mounted to the bar structure 102 are maintained even in the presence of a certain amount of deformation of the chassis of the user portable device.

Any of a variety of fastener components may be employed at the single chassis mounting point to mount the floating sensor assembly 100 to the device chassis via a single contact point. In some embodiments, one or more flexible fastener components are used, such as through the use of flexible materials (e.g., adhesive foam tape, rubber, silicone, and the like), or a mechanical joint that permits movement in one or more axes or planes, such as revolute joint that permits rotational translation about an axis (e.g., a hinge joint), a planar joint that permits translation along an axis (e.g., a pin-slot joint or a sliding joint), a ball joint that permits rotation about a number of axis (e.g., a ball-and-socket joint), mechanical joint mechanism that incorporates multiple coupled joints (e.g., a double-revolute joint or a revolute-and-ball joint), and the like. In the event a mechanical joint is implemented to fasten the sensor assembly to the device chassis at the single chassis mount point, one component of the mechanical joint may be fastened to the single chassis mount point and the complementary component of the mechanical joint may be fastened to the corresponding mount location on the device chassis, and the mechanical joint formed when the sensor assembly is joined to the device chassis during assembly. For example, for a pin-and-slot joint the pin component may be mounted on one of the floating sensor assembly 100 or the device chassis and the slot component may be mounted on the other. As another example, for a ball-and-socket joint, the ball component may be mounted on one of the floating sensor assembly 100 or the device chassis and the socket component may be mounted on the other. In other embodiments, the mounting fastener employs one or more rigid fastening components, such as through the use of one or more screws, bolts, press-fit pins, rivets, or a rigid adhesive bond between an area of a surface of the floating sensor assembly 100 and a corresponding area of a surface of the device chassis.

As used herein, a "chassis mount point" refers to an area of the floating sensor assembly 100 that is mechanically attached to the device chassis and that has a total dimension along the long axis of the floating sensor assembly 100 that is substantially less than the total length of the sensor assembly along the long axis. "Substantially less" in this context may depend on the dimensions of the floating sensor assembly 100, the material and structural form of the floating sensor assembly 100, and the flexibility of the particular fastening mechanism used at the chassis mount point. Thus, "substantially less" in this context means not more than 40% of the total length of the floating sensor assembly 100 along the long axis in some embodiments, not more than 30% of the total length of the floating sensor assembly 100 along the long axis in other embodiments, not more than 25% of the total length of the floating sensor assembly 100 along the long axis in other embodiments, not more than 20% of the total length of the floating sensor assembly 100 along the long axis in other embodiments, not more than 15% of the total length of the floating sensor assembly 100 along the long axis in other embodiments, not more than 10% of the total length of the floating sensor assembly 100 along the long axis in other embodiments, and not more than 5% of the total length of the floating sensor assembly 100 along the long axis in other embodiments. Thus, the use of two screws to connect the floating sensor assembly 100 to a device chassis and which have distance in between along the long axis of the floating sensor assembly 100 that is only 10% of the total length of the floating sensor assembly 100 along the long axis would constitute a single chassis mount point in certain embodiments. As another example, the area of the bar structure 102 to which a piece of adhesive foam tape having a lateral dimension of 20% of the lateral length of the floating sensor assembly 100 is attached to mechanically attach the floating sensor assembly 100 to a surface of a device chassis constitutes a single chassis mount point in certain embodiments.

As for the location of the single chassis mount point, a surface of the bar structure 102 may be used, or a surface of one of the sensors or other components mounted to the bar structure 102 may be used. Further, as described in greater detail below, the floating sensor assembly 100 may include a small circuit board attached to the bar structure 102 and which floats along with the bar structure 102 relative to deformation of the device chassis, and in such instances the single chassis mount point may be located on a surface of the circuit board. Any of a variety of factors may guide the choice of the location of the single chassis mount point. Typically, a location at or proximate to a center point of the bar structure 102 along its long axis or a location at or proximate to a center of max of the floating sensor assembly 100 would be appropriate. However, the design of the device chassis may present clearance issues or attachment mechanism issues at these points, or there already may be another component of feature present at the potential location. Accordingly, in some embodiments the location of the single chassis mount point may be positioned away from a location aligned with the center of the bar structure 102 or the center of mass of the floating sensor assembly 100.

Figure 3:
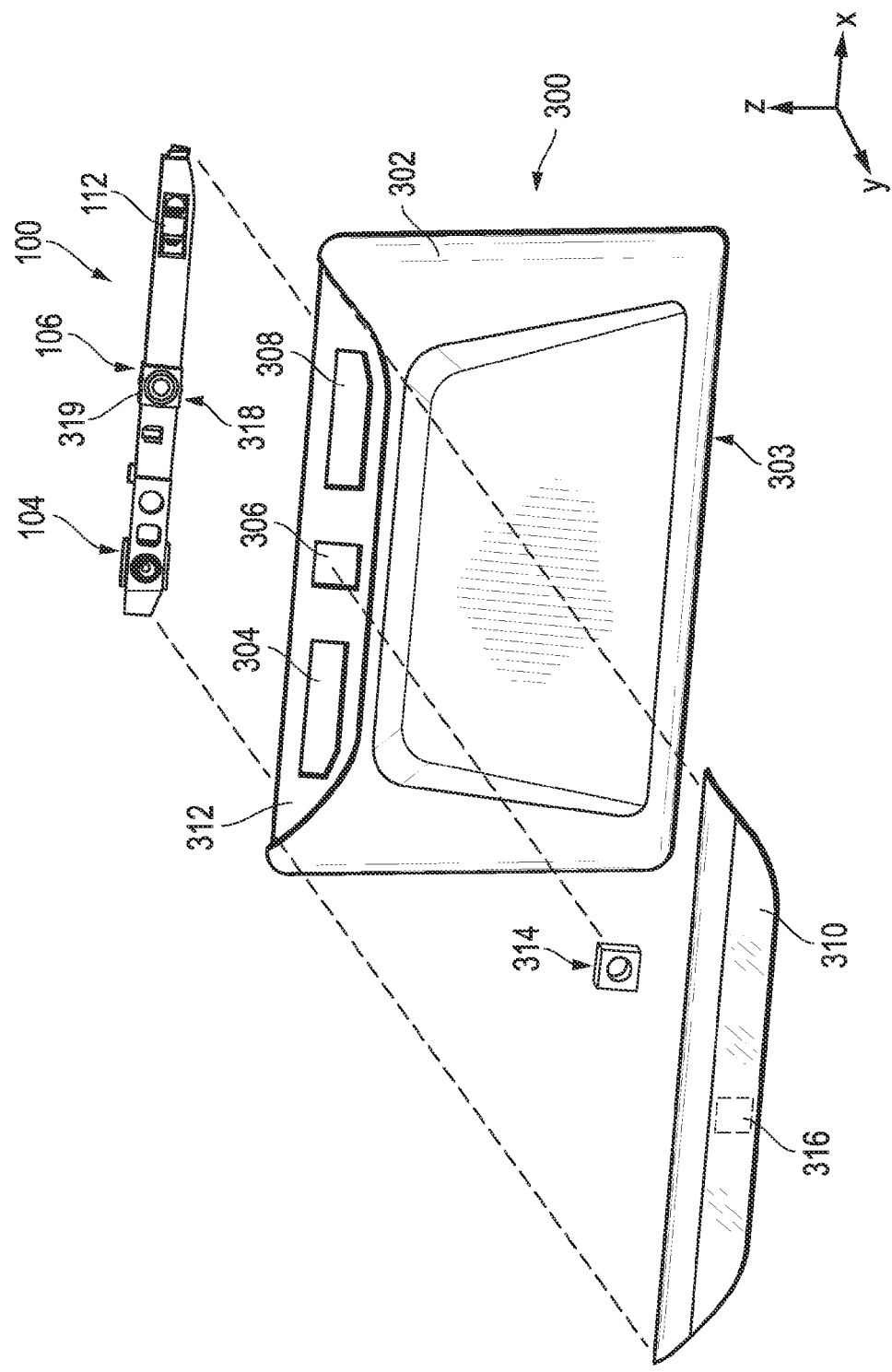
FIG. 3 is an exploded view of a user portable device implementing the floating sensor assembly of FIG. 1 in accordance with at least one embodiment of the present disclosure.

FIG. 3 is an exploded view illustrating an assembly of a user portable device 300 incorporating the floating sensor assembly 100 in accordance with at least one embodiment of the present disclosure. In the depicted example, the user portable device 300 comprises a tablet computer and the floating sensor assembly 100 is mounted to the backside housing 302 of a device chassis 303. Thus, for ease of illustration, FIG. 3 omits the front side housing, display, touch screen, battery, and other components of the device chassis 303. While a tablet form factor is depicted, it will be appreciated that the user portable device 300 may comprise any of a variety of user portable devices, such as a computing-enabled cellular phone, a personal digital assistant (PDA), a portable digital multimedia player, a handheld gaming console, and the like.

The body of the floating sensor assembly 100 is mounted internal to the device chassis 303 (that is, "behind" the backside housing 302), and thus the backside housing 302 includes a set of openings 304, 306, and 308 for the electro-optical sensors 104 and 106 and the structured light projector 112, respectively, when the floating sensor assembly 100 is aligned and joined with the backside housing 302 as shown. As described in greater detail below, the openings 304, 306, and 308 are dimensioned so as to provide sufficient clearance between the backside housing 302 and the corresponding portions of the floating sensor assembly 100 such that the backside housing 302 and the floating sensor assembly 100 do not come into direct contact (that is, contact in addition to the single mechanical contact point provided by the single chassis mount point) in the presence of deformation of the device chassis (and thus deformation of the backside housing 302).

In the illustrated example, the device chassis 303 implements a transparent structure 310 (e.g., a transparent plastic or glass section) that is affixed to the external surface of the backside housing 302 and which covers a region 312 of the backside housing 302 so as to protect the floating sensor assembly 100 from impact damage and from the intrusion of fluids and debris into the user portable device 300 via the spaces between the bar structure 102 and the edges of the openings 304, 306, and 308. The transparent structure 310 also provides, in this particular example, the corresponding surface of the device chassis 303 to which a mounting fastener 314 mounts the floating sensor assembly 100 via single chassis mounting point 318 of the floating sensor assembly 100. In the illustrated embodiment, the mounting fastener 314 comprises an adhesive foam tape piece that is positioned between the transparent structure 310 and the floating sensor assembly 100 in the opening 306 during assembly of the user portable device 300 such that one side of the adhesive foam tape piece adheres to an area 316 of the transparent structure 310 and the other side of the adhesive foam tape piece 314 adheres to an area 319 of the bar structure 102 circumscribing the perimeter of the electro-optical sensor 106. The adhesive foam tape piece 314 thus provides a flexible mechanical connection between the bar structure 102 (as part of the floating sensor assembly 100) and the transparent structure 310 (as part of the device chassis 303), and thus the area 319 thus serves as the single chassis mount point 318 of the floating sensor assembly 100 in this example. In other embodiments, the mounting fastener 314 may employ other fastening components, such as one or more screws, could be used to fasten the floating sensor assembly 100 to the transparent structure 310 through the opening 306, or the mounting fastener 314 can mount the floating sensor assembly 100 to the device chassis at a different location, such as via an adhesive foam tape piece positioned at one of the openings 304 and 308 to connect the bar structure 102 to the transparent structure 310 in a different location, or through the use of an adhesive foam tape piece or other fastener to connect the back side of the floating sensor assembly 100 to an internal component of the device chassis, such as a PCB or battery (not shown) within the user portable device 300 or to an internal surface of a frontside housing (not shown) of the device chassis 303.

Figure 4:
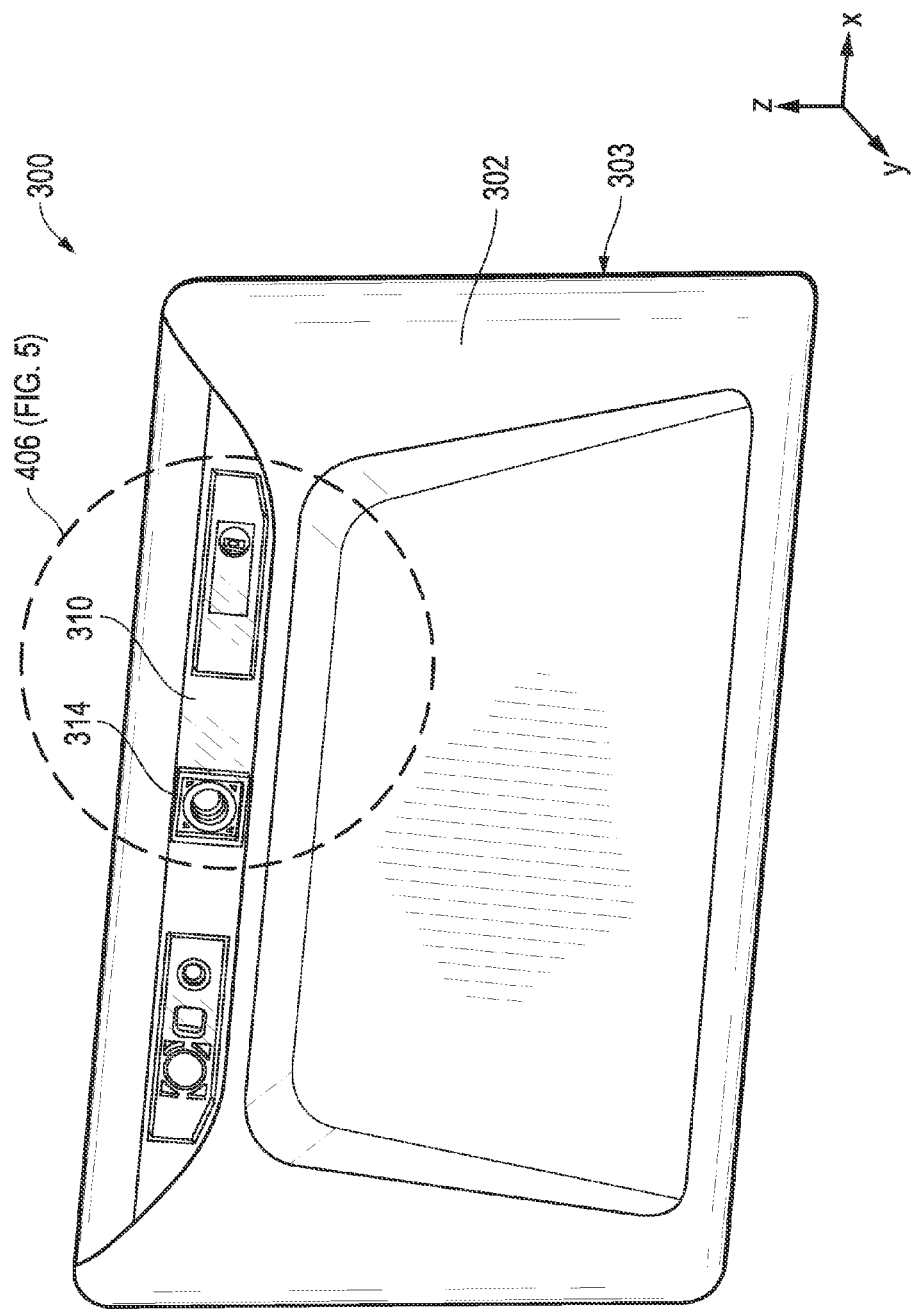
FIG. 4 is a perspective view of a back side of the user portable device of FIG. 3 in accordance with at least one embodiment of the present disclosure.

FIG. 4 illustrates a perspective view of the back side of the user portable device 300 after assembly in accordance with at least one embodiment. With the transparent structure 310 affixed to the backside housing 302 and the floating sensor assembly 100 mounted to the device chassis 303 of the user portable device 300 via mounting fastener 314 affixed to the transparent structure 310, torsional forces by the user's handling of the device chassis 303 while, for example, viewing imagery on a display (not shown) on a front side 404 of the device will not translate to torsional forces on the floating sensor assembly 100 as the floating sensor assembly 100 is able to "float" relative to the backside housing 302 and the rest of the device chassis 303.

Figure 5:
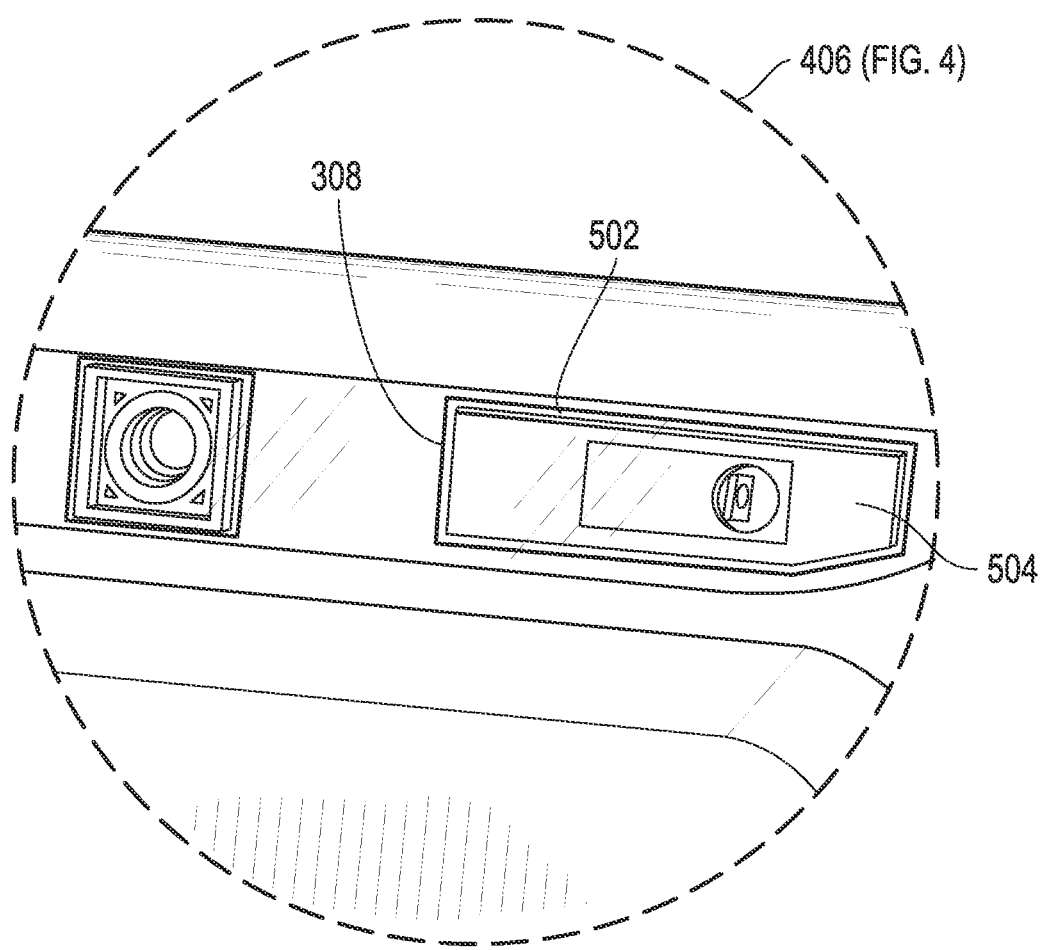
FIG. 5 is an enlarged view of a portion of the back side of the user portable device of FIG. 4 in accordance with at least one embodiment of the present disclosure.

This ability of the floating sensor assembly 100 to float relative to the rest of the user portable device 300 is enabled in part by the openings 304, 306, and 308 in the backside housing 302. These openings are dimensioned so as to provide spacing between the material of the backside housing 302 and the corresponding portions of the floating sensor assembly 100 that extend or project into the openings. This spacing provides clearance between the backside housing 302 and these projections of the floating sensor assembly 100, and thus can accommodate deformation of the backside housing 302 without bringing the floating sensor assembly 100 and the backside housing 302 into further contact. To illustrate, FIG. 5 depicts an enlarged detail view 406 of a portion the back side view of the user portable device 300 as presented in FIG. 4. As shown by this enlarged view, the opening 308 is dimensioned so as to provide a gap 502 around a corresponding portion 504 of the floating sensor assembly 100 that projects into the opening 308. The opening 308 is dimensioned relative to the portion 504 such that the gap 502 sufficient to prevent contact between the backside housing and the portion 504 in the presence of deformation of the device chassis 303 in the presence of torque anticipated to be applied by the user during normal use of the user portable device 300.

Figure 6:
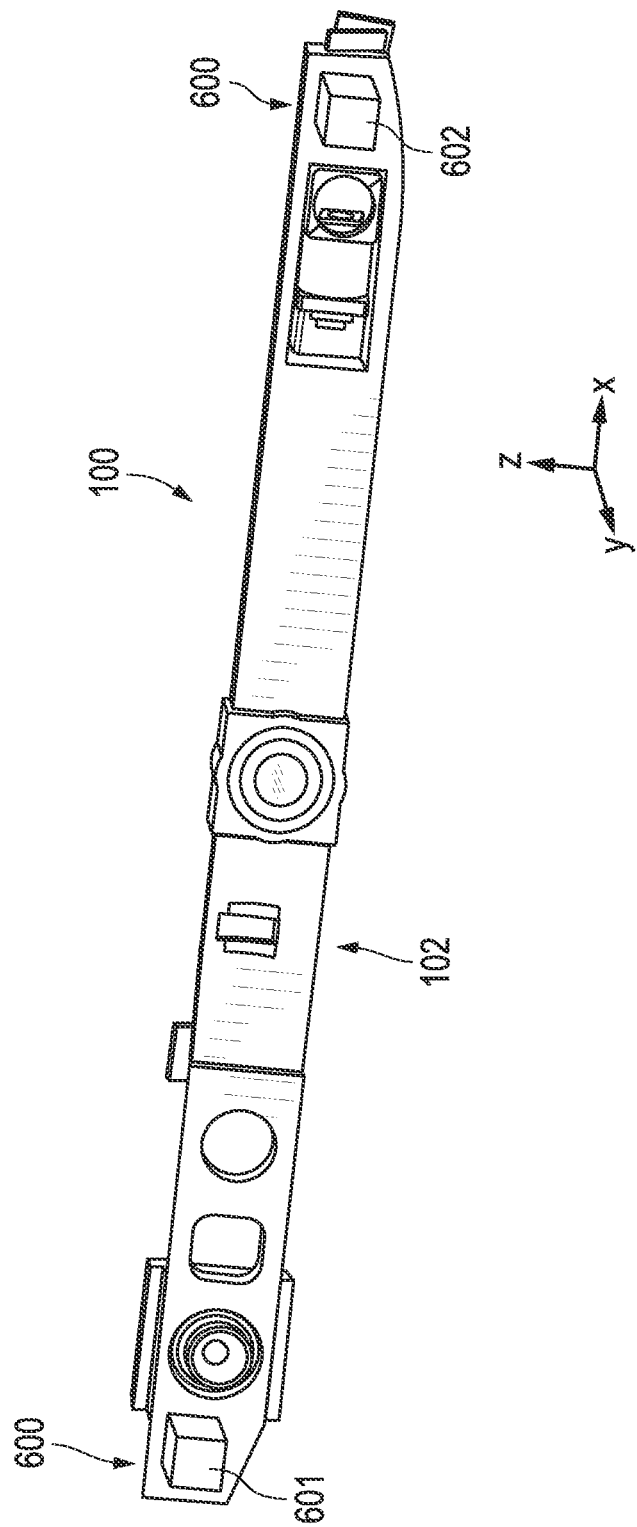
FIG. 6 is a perspective view of a front side of an alternative implementation of the floating sensor assembly that utilizes a mounting fastener in the form of two adhesive foam pieces in accordance with at least one embodiment of the present disclosure.
Figure 7:
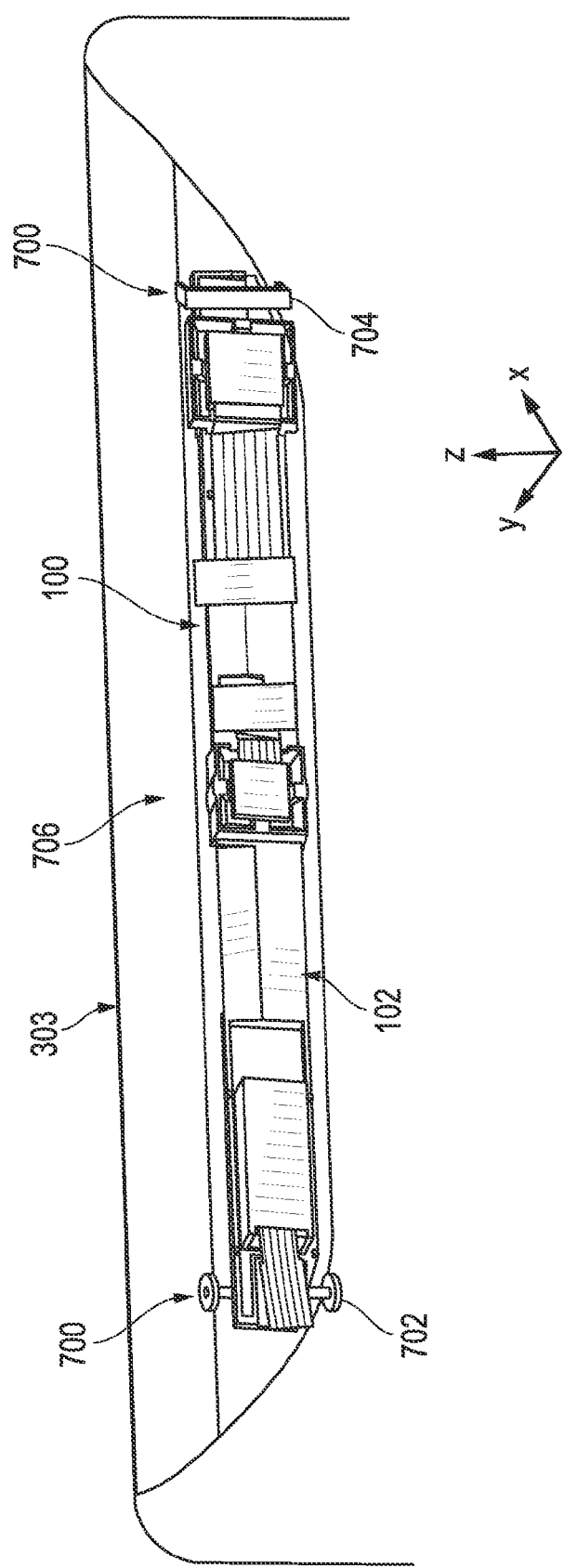
FIG. 7 is a perspective view of a backside of an alternative implementation of the floating sensor assembly that utilizes a mounting fastener in the form of a revolute joint and a sliding joint in accordance with at least one embodiment of the present disclosure.
Figure 8:
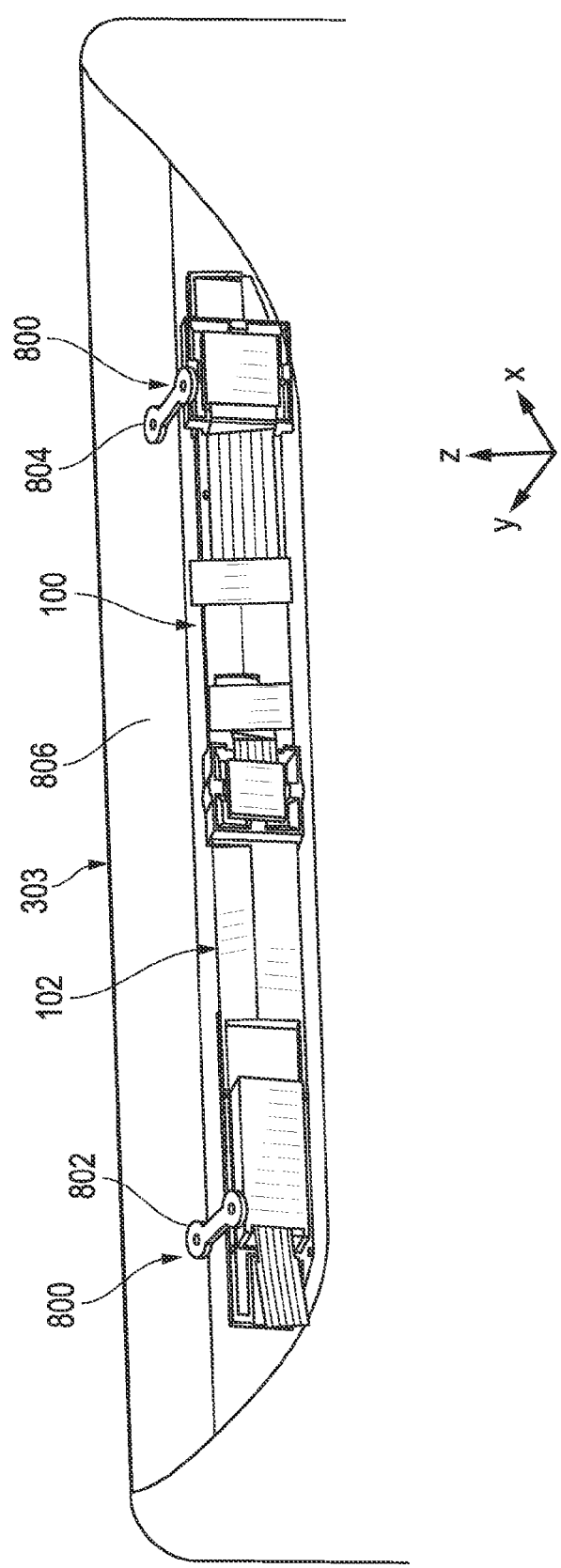
FIG. 8 is a perspective view of a backside of an alternative implementation of the floating sensor assembly that utilizes a mounting fastener in the form of two double-revolute joints in accordance with at least one embodiment of the present disclosure.

FIGS. 6-8 illustrate example implementations of a mounting fastener for the floating sensor assembly 100 using two or more flexible fastening components to permit "floating" of the floating sensor assembly in the presence of deformation of a mounting surface of the user portable device 300 along one or more axes during user handling of the user portable device 300, and thus allowing the geometric configurations of the sensors of the floating sensor assembly 100 to be maintained in the presence of such deformation. FIG. 6 depicts a front view of the sensor assembly 100 and an implementation of a mounting fastener 600 employing fastening components in the form of two thick adhesive foam tape pieces 601 and 602 distally affixed on one side along the long axis of the bar structure 102. The opposite side of each of the adhesive foam tape pieces 601 and 602 are affixed to corresponding areas of an internal surface of the device chassis 303 (FIG. 3), and thus flexibly mounting the floating sensor assembly 100 to the device chassis 303. The flexible material of the adhesive foam pieces 601 and 602 absorbs forces between the floating sensor assembly 100 and the mounting surface of the device chassis 303. This allows the floating sensor assembly 100 to translate to some degree along each of the x-, y-, and z-axis relative to the device chassis 303, and this freedom of movement isolates the bar structure 102 from the deformation that may occur in the device chassis 303.

FIG. 7 depicts a back view of the sensor assembly 100 and an implementation of a mounting fastener 700 employing fastening components in the form of a revolute joint 702 attached to the bar structure 102 at one mounting point and a sliding joint 704 attached to the bar structure 102 at another mounting point. The revolute joint 702 and the slide joint 704 in turn are attached at corresponding mounting points of an inner surface 706 of the device chassis 303, such as the transparent structure 310 (FIG. 3) or inner surface of the backside housing 302 (FIG. 3). With this configuration, the rotation ability about the z-axis provided by the revolute joint 702 and the sliding ability along the x-axis provided by the sliding joint 704 permits a degree of lateral translation of the floating sensor assembly 100 along the long axis in the presence of deformation of the device chassis 303.

FIG. 8 depicts a back view of the sensor assembly 100 and an implementation of a mounting fastener 800 employing fastening components in the form of a double-revolute joint 802 attached to the bar structure 102 at one mounting point and another double-revolute joint 804 attached to the bar structure 102 at another mounting point. The double-revolute joints 802 and 804 in turn are attached at corresponding mounting points of an inner surface 806 of the device chassis 303, such as the transparent structure 310 (FIG. 3) or inner surface of the backside housing 302 (FIG. 3). In this configuration, mounting fastener permits a significant degree of translation of the floating sensor assembly 100 in the x-y plane in the presence of deformation of the device chassis 303.

Although FIGS. 6-8 illustrate various example combinations of multiple joints for implementation as a mounting fastener to provide translational movement for the floating sensor assembly 100, other joint combinations may be employed for the mounting fastener using the guidelines provided herein. For example, the mounting fastener may employ a double-revolute joint in combination with a sliding joint, a pin-and-slot joint in combination with a ball-and-socket joint, and the like.

FIG. 9 illustrates the electrical connectivity of the floating sensor assembly 100 to other components of the user portable device 300 in accordance with at least one embodiment. As noted above, the floating sensor assembly 100 employs only a single chassis mount point to effectively allow the floating sensor assembly 100 to "float" relative to the rest of the user portable device 300 in the presence of deformation of the device chassis 303. However, various components of the user portable device 300 utilize sensor data provided by the sensors mounted in the floating sensor assembly 100, and various components may control the operation of other components of the floating sensor assembly 100. To illustrate, the user portable device 300 may include a printed circuit board (PCB) 902 that has a processing component 904 that receives sensor data from the electro-optical sensors 104 and 106 and processes this sensor data based on an assumption of a fixed geometric configuration between the two sensors to provide stereoscopic view functionality. As another example, the processing component 904 may receive sensor data from one or both of the electro-optical sensors 104 and 106 in conjunction with inertial data from the IMU 116 and processes this data based on an assumption of fixed geometric configurations among these sensor so as to provide visual inertial functionality. Moreover, the PCB 902 may implement a controller 906 to control operation of various support components of the floating sensor assembly 100, such as by controlling the activation of the structured light projector 112 or one or more visible light flash sources of the floating sensor assembly 100.

To facilitate this communication between components of the PCB 902 and the components of the floating sensor assembly 100 (as well as to provide power to the floating sensor assembly 100), flexible electrical connections are employed so as to provide electrical connectivity while substantially preventing the transfer of mechanical force between the PCB 902 and the floating sensor assembly 100 though these electrical connectors. These flexible electrical connections may take the form of flexible flat cables, such as a flexible flat cable 908 (corresponding to cable 208 of FIG. 2) that provides electrical connectivity between the IMU 116 and the PCB 902 (similar cables for the other components of the floating sensor assembly 100 are omitted for ease of illustration). Deflection or other movement of the PCB 902 relative to the floating sensor assembly 100 thus will merely result in a change in the shape of the cable 908, with minimal additional force imparted on the floating sensor assembly 100 via the cable 908. Other means for providing the electrical connections can include, for example, individual flexible wires, wire bundles, cables, wiring harnesses, and the like.

FIG. 10 illustrates an alternative embodiment of the floating sensor assembly 100 and its electrical connectivity to the other components of the user portable device 300. In at least one embodiment, the floating sensor assembly 100 may implement a small PCB 1002 or other circuit board mounted to the bar structure 102 and which implements circuit components for supporting the operation of the sensors and other components mounted to the bar structure 102. For example, the PCB 1002 may employ circuitry that performs pre-processing of sensor data from the sensors of the floating sensor assembly 100, manages the operation of the sensors or manages the operation of the support components for the sensors, and the like. The PCB 1002 in turn may communicate with the main PCB 902 affixed to the device chassis 303 via one or more flexible electrical connections, such as via one or more flat flexible cables 1004. As the PCB 1002 is mounted to the bar structure 102 and as the flexible electrical connections impart negligible mechanical forces from the PCB 902, the PCB 1002 effectively "floats" along with the rest of the floating sensor assembly 100 relative to the device chassis 303. Moreover, the rigidity inherent to the board substrate may further bolster the overall rigidity of the floating sensor assembly 100.

FIG. 11 illustrates a perspective view of a front side of a floating sensor assembly 1100 of a machine-vision-enabled user portable device in accordance with at least one embodiment of the present disclosure. In the depicted example, the floating sensor assembly 100 comprises an oblong bar structure 102 upon which a plurality of machine-vision sensors and related components are mounted. The bar structure 102 is composed of one or more materials that impart rigidity along one or more axes of the bar structure 102. To illustrate, the bar structure 102 may be formed from one or combination of a metal or metal alloy, carbon fiber, ceramic, glass, glass fiber reinforced epoxy resin or laminate (e.g., FR4), and the like. As a particular example, the bar structure 102 may consist essentially of aluminum-magnesium (Al—Mg) alloy, which demonstrates suitable rigidity while being cost effective and relatively light. The bar structure 102 further may employ structural features, or a cross-section or profile, that enhance its rigidity. To this end, the bar structure 102 may be formed with one or more spines along its long axis (the x-axis in the depicted example) or formed with a rail profile, a C-channel profile, a T-channel profile, a hollow structural section (HSS) profile, an angle profile, and the like, or combinations thereof.

The bar structure 102 comprises mounting areas for the machine-vision sensors and associated non-sensor components. These mounting areas can include areas on a front face of the bar structure 102, areas on the back face of the bar structure 102 that are aligned with opening or other openings in the bar structure, recesses in the bar structure in which corresponding sensors are mounted. To illustrate, in the depicted example the floating sensor assembly 100 includes electro-optical sensors 104 and 106 (e.g., visible-light or infrared imaging cameras) mounted to areas on the back side of the bar structure 102 with the lenses of the electro-optical sensors 104 and 106 protruding through openings 108 and 110, respectively, in the bar structure 102. The floating sensor assembly 100 also includes a structured light projector 112 mounted in a recess 114 formed at the front side of the bar structure 102, as well as an inertial measurement unit (IMU) 116 mounted at an area on the back side of the bar structure 102. The IMU 116 can comprise one or more inertial sensors, such as a gyroscope, accelerometer, and the like. Other components mounted to the bar structure 10 can include, for example, a flash source for providing camera flashes, a light sensor to detect the intensity of light incident on the user portable device, and the like. The sensors and other components may be mounted to the bar structure 102 using any of a variety of fastening means, such as high-strength adhesive, high-strength adhesive foam tape, screws, bolts, rivets, press-fit pins, cold welding, and the like.

FIG. 11 illustrates a perspective view of a back side of a mounting structure 1102 of a floating sensor assembly 1100 of a machine-vision-enabled user portable device in accordance with at least one embodiment of the present disclosure. In the depicted example, the mounting structure 1102 serves as the structure upon which a plurality of machine-vision sensors and related components are mounted. In the example of FIG. 11, the mounting structure 1102 has the form of a plate structure and thus is referred to herein as "plate structure 1102." The plate structure 1102 is composed of one or more materials that impart rigidity along one or more axes, such as one or combination of a metal or metal alloy, carbon fiber, ceramic, glass, glass fiber reinforced epoxy resin or laminate (e.g., FR4), and the like. As a particular example, the plate structure 1102 may consist essentially of aluminum-magnesium (Al—Mg) alloy. The plate structure 1102 further may employ structural features, or a cross-section or profile, that enhance its rigidity. For example, the plate structure 1102 may be formed with one or more rails, such as a rail 1103 extending along at least a portion of the perimeter of the plate structure 1102 and a rail 1105 extending across a width of a segment of the plate structure 1102.

The plate structure 1102 comprises mounting areas for the machine-vision sensors and associated non-sensor components. These mounting areas can include areas on a front face of the plate structure 1102, areas on the back face of the plate structure 1102 that are aligned with opening or other openings in the bar structure, recesses in the plate structure in which corresponding sensors are mounted. To illustrate, in the depicted example the floating sensor assembly 1100 includes mounting areas 1104 and 1106 for mounting imaging cameras 1204 and 1206 (shown in FIG. 12) with the lenses of the imaging cameras 1204 and 1206 (or other electro-optical sensors) protruding through openings 1108 and 1110, respectively, in the plate structure 1102. The floating sensor assembly 1100 also includes a mounting area 1112 for mounting a depth camera 1206 (FIG. 12), with the lens of the depth camera 1208 protruding through an opening 1114 in the plate structure 1102, as well as a mounting area 1118 for mounting an inertial measurement unit (IMU) 1216 (FIG. 12). Other components mounted to the plate structure 1102 can include, for example, a flash source for providing camera flashes, a light sensor to detect the intensity of light incident on the user portable device, and the like. The sensors and other components may be mounted to the plate structure 1102 using any of a variety of fastening means, such as high-strength adhesive, high-strength adhesive foam tape, screws, bolts, rivets, press-fit pins, cold welding, and the like.

FIG. 12 illustrates another perspective view of the back side of the floating sensor assembly 1100 with sensors mounted therein in accordance with at least one embodiment. As illustrated by this view, the imaging cameras 1204, 1206, the depth camera 1208, and the IMU 1216 each is mounted in its corresponding mounting area of the plate structure 1102 and these sensors and other components of the floating sensor assembly 1100 are electrically connected to corresponding components of a user portable device via flexible electrical connections that do not impart material mechanical forces on the floating sensor assembly 100. In the depicted example, the imaging cameras 1204, 1206, the depth camera 1208, and the IMU 1216 are electrically connected to a printed circuit board (PCB) or other component of the chassis of the user portable device via flexible flat cables 1220, 1222, 1224, and 1226, respectively.

FIG. 13 illustrates a perspective view of a front side of the floating sensor assembly 1100 as mounted to a PCB 1302 of a device chassis 1304 of a user portable device 1300 (e.g., a cell phone) in accordance with at least one embodiment. As illustrated by this view, the floating sensor assembly 1100 is mounted to the device chassis 1304 such that the lenses of the imaging cameras 1204, 1206 and the depth camera 1208 face away from the device chassis 1304 and are coaxial with corresponding external openings in a housing (not shown) of the device 1300.

The rigidity of the plate structure 1102 facilitates the maintenance of fixed, or baseline, geometric configurations between the machine-vision sensors that may be used assumed by applications of the user portable device 1300 employing the floating sensor assembly 1100. For example, as similarly noted above one or more machine-vision processes executed at the user portable device may assume that there is a fixed distance between the imaging cameras 1204, 1206, and further that the relationship between the angles of view of these sensors is fixed. As another example, one or more machine vision processes executed at the user portable device 1300 may assume that there is a fixed distance between the imaging sensor 1206 and the IMU 1216. These baseline geometric configurations may be determined from the design of the floating sensor assembly 1100. Alternatively, some or all of the baseline geometric configurations may be determined through application of a sensor calibration process on a device-by-device basis.

In the absence of torque or other deformation forces from user handling, the profile and materials of the plate structure 1102 are sufficiently rigid to maintain the machine-vision sensors in their baseline geometric configurations while adhering to cost, size, and weight limitations. However, the form factor of the user portable device 1300 may result in substantial torque placed on the user portable device when being handled by a user. One such example is a device 1300 having a cell phone form factor having a relatively thin and flexible housing and PCB within the housing, and thus may be subject to deformation along one or more axes simply through the act of the user holding the device 1300. This deformation otherwise could deform the plate structure 1102 (and thus shift the sensors relative to each other).

To limit the impact of deformation of the device chassis, in at least one embodiment the floating sensor assembly 1100 employs one or more flexible mounting fasteners to mount the floating sensor assembly 1100 to the device chassis 1304 or the PCB 1302 so as to isolate the floating sensor assembly 1100 from the deformation of the user portable device 1300. These flexible mounting fasteners are configured to permit translation of the floating sensor assembly along one or more axes relative to the corresponding surface of the structure upon which the floating sensor assembly 1100 is mounted.

To illustrate, referring back to FIG. 11, the plate structure 1102 may include mounting holes 1120, 1122 through which a screw, rivet, press-fit pin, or other fastener may be positioned so as to mount the plate structure 1102 to the PCB 1302. For example, as illustrated in FIG. 13, screws 1306, 1308 may mount the plate structure 1102 to the PCB 1302 via the mounting holes 1120, 1122, respectively. The screws 1306, 1308 may be loosely driven or otherwise configured so as to provide a relatively loose attachment between the PCB 1302 and the plate structure 1102. In some embodiments, the flexibility of these attachments is further supplied through the use of flexible material between the regions of the plate structure 1102 surrounding the mounting holes 1120, 1122 and the corresponding surface regions of the PCB 1302. To illustrate, referring again to FIG. 11, the plate structure 1102 may employ compliant, or flexible, washers 1124, 1126 at the mounting holes 1120, 1122, respectively, with the flexible washer 1124 having an opening coaxial with the mounting hole 1120 and the flexible washer 1126 having an opening coaxial with the mounting hole 1122. The flexible washers 1124, 1126 may be composed of any of a variety of compliant materials, such as rubber, plastic, adhesive foam tape, silicone, or a combination thereof.

Further, in some embodiments, the plate structure 1102 may also include a single fixed, non-flexible, mounting point to so as to rigidly affix the plate structure 1102 to one point on the PCB 1302 or the device chassis 1304. To illustrate, the plate structure 1102 may include a mounting hole 1128 (FIGS. 11 and 12) through which a screw, pin, rivet or other fastener may be positioned so as to firmly affix that point of the plate structure 1102 to the PCB 1302 and device chassis 1304. Alternatively, a rigid adhesive bond or a spot weld may be used. This single point of rigid attachment may serve to limit the amount of movement of the plate structure 1102 relative to the rest of the device 1300. However, as there is only a single point of rigid attachment, and as the other mounting positions provide a degree of flexible movement between the plate structure 1102 and the PCB 1302/device chassis 1304, the plate structure 1102 may be effectively isolated from deformation of the PCB 1302/device chassis 1304 under anticipated usage of the device 1300.

Although FIGS. 11-13 illustrate the use of flexible mounting fixtures in the form of mounting holes with coaxial flexible material to attach the floating sensor assembly 1100 to the PCB 1302 and device chassis 1304, in other embodiments flexible mechanical joints may be used in place of one or more of these flexible mounting holes. To illustrate, the floating sensor assembly 1100 may use one or more mechanical joints that permits movement in one or more axes or planes, such as revolute joint that permits rotational translation about an axis (e.g., a hinge joint), a planar joint that permits translation along an axis (e.g., a pin-slot joint or a sliding joint), a ball joint that permits rotation about a number of axis (e.g., a ball-and-socket joint), mechanical joint mechanism that incorporates multiple coupled joints (e.g., a double-revolute joint or a revolute-and-ball joint), and the like. To illustrate, the floating sensor assembly 1100 may use one or more of the flexible mechanical joints described above with reference to the floating sensor assembly 100 of FIGS. 1-10.

In this document, relational terms such as first and second, front and back, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A user portable device comprising:
a device chassis comprising at least one opening at a surface of the device chassis; and
a sensor assembly aligned with the at least one opening and comprising:
a mounting structure;
a plurality of sensors mounted to the mounting structure, the plurality of sensors comprising at least two sensors utilized by the user portable device, and wherein the mounting structure maintains a baseline geometric configuration between the at least two sensors; and
a mounting fastener that mounts the sensor assembly to the device chassis at a single chassis mount location on the sensor assembly so as to isolate the sensor assembly with a clearance between the device chassis and the mounting structure sufficient to prevent alteration of the baseline geometric configuration between the sensors from deformation based on a force at the surface of the device chassis along one or more axes during user handling of the user portable device.

2. The user portable device of claim 1, wherein:
the device chassis comprises a transparent structure overlying the at least one sensor opening; and
the single chassis mount point comprises a mechanical revolute joint that permits rotational translation about an axis of the revolute joint.

3. The user portable device of claim 1, wherein the mounting fastener comprises at least one of: adhesive foam tape; a bolt; a screw; a rivet; a press-fit pin; and a rigid adhesive bond.

4. The user portable device of claim 1, wherein the mounting fastener comprises at least one of: adhesive foam tape; a bolt; a screw; a rivet; a press-fit pin; and a rigid adhesive bond.

5. The user portable device of claim 1, wherein the mounting fastener comprises at a mounting hole, a flexible washer coaxial with the mounting hole, and a fastener extending through the mounting hole and flexible washer, the fastener affixed to the device chassis.

6. The user portable device of claim 1, wherein the mounting fastener comprises at least one joint, the at least one joint including at least one of: a revolute joint; a ball joint; and a sliding joint.

7. The user portable device of claim 1, wherein:
the mounting fastener comprises a first flexible mounting component mounting the sensor assembly to the device chassis at a first point and a second flexible mounting component mounting the sensor assembly to the device chassis at a second point.

8. The user portable device of claim 7, wherein:
the first flexible mounting component comprises a first adhesive foam piece; and
the second flexible mounting component comprises a second adhesive foam piece.

9. The user portable device of claim 7, wherein:
the first flexible mounting component comprises two revolute joints; and
the second flexible mounting component comprises one of: two revolute joints; or a sliding joint.

10. The user portable device of claim 7, wherein:
the first flexible mounting component comprises a revolute joint; and
the second flexible mounting component comprises a sliding joint.

11. The user portable device of claim 1, further comprising:
  a circuit board comprising a processing component to process data from the sensors based on an assumption of the baseline geometric configuration between at least two of the sensors of the plurality of sensors; and
  wherein the sensor assembly is electrically coupled to the circuit board via a flexible electrical connection.

12. The user portable device of claim 11, wherein the at least two sensors comprise first and second electro-optical sensors.

13. The user portable device of claim 12, wherein the at least two sensors further comprise an inertial sensor.

14. The user portable device of claim 11, wherein the at least two sensors comprise an electro-optical sensor and an inertial sensor.

15. The user portable device of claim 1, wherein the at least one opening is dimensioned to avoid contact between the sensor assembly and the device chassis in the presence of deformation of the device chassis.

16. A machine vision sensor assembly comprising:
  a mounting structure;
  a plurality of sensors mounted to the mounting structure, the plurality of sensors comprising at least one electro-optical sensor and an inertial sensor; and
  a single chassis mount point to mount the sensor assembly to a corresponding point of a chassis of a user portable device thereby forming a clearance between the chassis and the mounting structure sufficient to prevent alteration of a baseline geometric configuration between the one electro-optical sensor and another sensor of the plurality sensors when the chassis of the user portable device is exposed to a force during normal user handling of the user portable device.

17. The machine vision sensor assembly of claim 16, wherein the mounting structure consists essentially of one of: a metal; and metal alloy.

18. The machine vision sensor assembly of claim 16, wherein the single chassis mount point is located at one of: a center point on a long axis of the machine vision sensor assembly; and a center of mass of the machine vision sensor assembly.

19. The machine vision sensor assembly of claim 16, further comprising:
  a rigid fastener to rigidly affix the machine vision sensor assembly to the chassis of the user portable device at the single chassis mount point.

20. The machine vision sensor assembly of claim 16, further comprising:
  at least one component of a flexible fastener to flexibly affix the machine vision sensor assembly to the chassis of the user portable device at the single chassis mount point.

21. The machine vision sensor assembly of claim 20, wherein the at least one component comprises at least one of:
  adhesive foam tape;
  a flexible washer;
  a component of a planar joint; and
  a component of a ball joint.

22. The machine vision sensor assembly of claim 16, further comprising:
  a circuit board mounted to the mounting structure, the circuit board comprising:
    circuitry to control operation of at least one of the plurality of sensors; and
  a flexible electrical connection to electrically couple the circuit board to a circuit board affixed to the chassis of the user portable device.

23. A portable computing device comprising:
  a device chassis comprising a display disposed at a first surface and a sensor assembly disposed at a second surface, the sensor assembly aligned with at least one opening at the second surface;
  the sensor assembly comprising a mounting structure having a plurality of sensors, the plurality of sensors comprising at least one imaging camera;
  a circuit board affixed to the device chassis and electrically coupled to the plurality of sensors via at least one flexible electrical connection, the circuit board including a processing component to provide at least one of visual telemetry processing or stereoscopic vision processing based on a baseline geometric configuration between at least two sensors of the plurality of sensors; and
  a mounting fastener that mounts the sensor assembly to the device chassis at a single mount point so as to isolate the sensor assembly from deformation of the surface of the device chassis along one or more axes during user handling of the portable computing device by forming a clearance between the device chassis and the mounting structure sufficient to prevent alteration of the baseline geometric configuration.

24. The portable computing device of claim 23, wherein the plurality of sensors further comprise first and second imaging cameras having the fixed geometric configuration.

25. The portable computing device of claim 23, wherein the plurality of sensors further comprise an imaging camera and an inertial sensor having the fixed geometric configuration.

26. A portable computing device comprising:
  a device chassis comprising a display disposed at a first surface and a sensor assembly disposed at a second surface, the sensor assembly aligned with at least one opening at the second surface;
  the sensor assembly comprising a mounting structure having a plurality of sensors, the plurality of sensors comprising at least one imaging camera;
  a circuit board affixed to the device chassis and electrically coupled to the plurality of sensors via at least one flexible electrical connection, the circuit board including a processing component to provide at least one of visual telemetry processing or stereoscopic vision processing based on a baseline geometric configuration between at least two sensors of the plurality of sensors; and
  a mounting fastener that mounts the sensor assembly to the device chassis so as to isolate the sensor assembly from deformation of the surface of the device chassis along one or more axes during user handling of the portable computing device, wherein clearances between the at least one opening and the sensor assembly are sufficient to prevent alteration of the geometric configuration between the at least two sensors in the presence of forces anticipated to be placed on the portable computing device by users of the portable computing device under normal use.

* * * * *